(12) United States Patent
Boden

(10) Patent No.: US 6,457,214 B1
(45) Date of Patent: Oct. 1, 2002

(54) TAMPER-RESISTANT CORD LOCK APPARATUS

(76) Inventor: Robert O. Boden, 1580 Gaywood Dr., Altadena, CA (US) 91001-1841

( * ) Notice: Subject to any disclaimer, the term of this patent is extended or adjusted under 35 U.S.C. 154(b) by 0 days.

(21) Appl. No.: 09/687,333

(22) Filed: Oct. 13, 2000

(51) Int. Cl.$^7$ ................................................ A44B 1/04
(52) U.S. Cl. ................ 24/136 R; 24/115 R; 24/136 L; 24/115 M
(58) Field of Search .................... 24/136 R, 136 L, 24/115 G, 115 M, 115 R, 122.6, 130, 132 R, 115 H

(56) References Cited

U.S. PATENT DOCUMENTS

| | | | | |
|---|---|---|---|---|
| 2,573,806 A | * | 11/1951 | Paterson | 24/136 R |
| 3,845,575 A | * | 11/1974 | Boden | 24/115 M |
| 4,156,574 A | * | 5/1979 | Boden | 24/115 M |
| 4,665,590 A | | 5/1987 | Udelhofen et al. | 24/115 |
| 4,680,835 A | * | 7/1987 | Horng | 24/136 R |
| 4,788,755 A | * | 12/1988 | Kasai | 24/136 A |
| 4,878,269 A | | 11/1989 | Anscher et al. | 24/115 |
| 4,895,402 A | * | 1/1990 | Tomita | 24/30.5 R |
| 5,454,140 A | * | 10/1995 | Murai | 24/115 H |
| 5,894,639 A | | 4/1999 | Boden et al. | 24/115 |
| 5,903,959 A | * | 5/1999 | Leonardi | 24/115 G |
| 6,185,798 B1 | * | 2/2001 | Ton | 24/115 G |

FOREIGN PATENT DOCUMENTS

| | | | | |
|---|---|---|---|---|
| GB | 2035440 A | * | 6/1980 | |
| GB | 2066891 A | * | 7/1981 | |

* cited by examiner

Primary Examiner—Robert J. Sandy
Assistant Examiner—André Jackson
(74) Attorney, Agent, or Firm—Christie, Parker & Hale, LLP

(57) ABSTRACT

A cord lock apparatus includes an open-ended housing and a slide member slidably received at least partially in the housing and movable relative to the housing between a cord locking position and a cord releasing position. The slide member includes cord engaging structure that is displaceable relative to the slide member in two generally orthogonal directions. In another embodiment, the cord lock apparatus includes respective openings on the housing and slide member which are substantially aligned when the slide member is in the cord locking position. A lock may be extended through the respective openings to lock the slide member in the cord locking position.

44 Claims, 4 Drawing Sheets

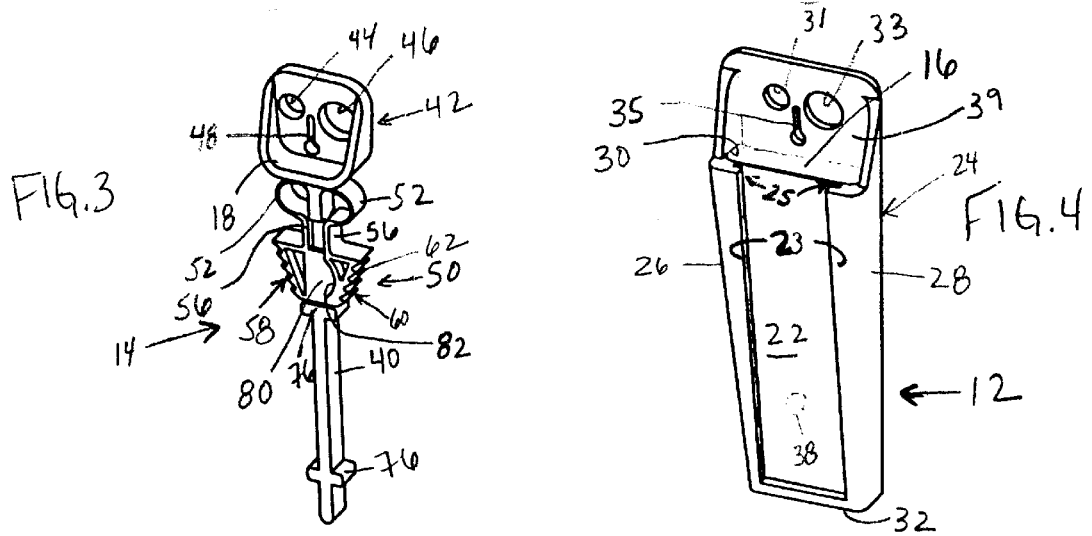
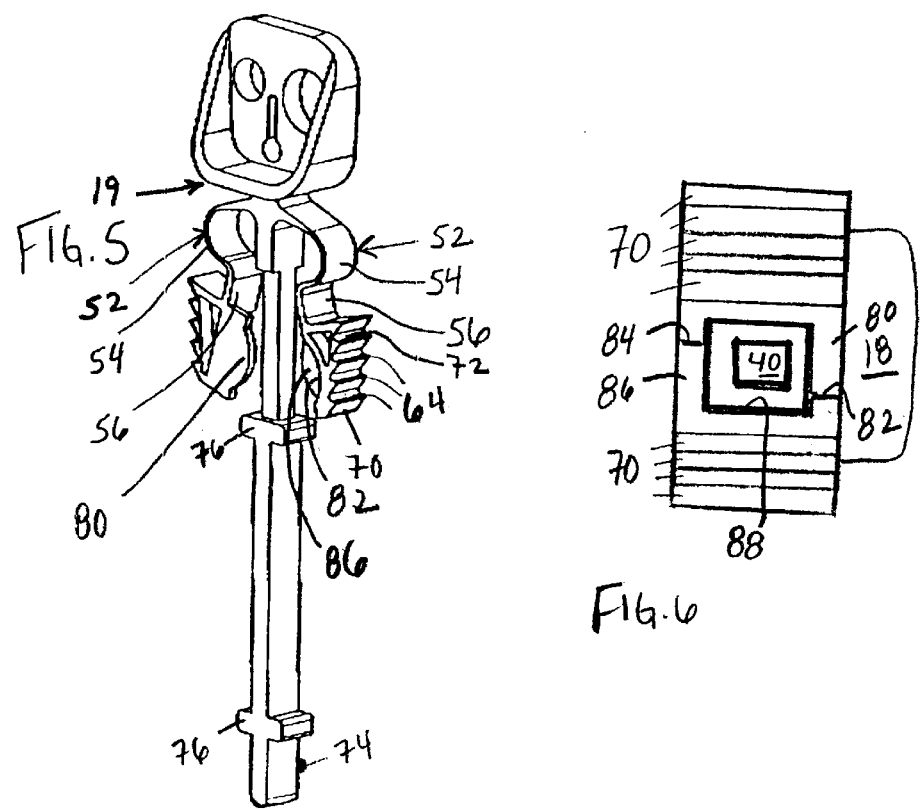

TAMPER-RESISTANT CORD LOCK APPARATUS

BACKGROUND OF THE INVENTION

1. Field of the Invention

The present invention relates to cord fasteners for releasably engaging a pair of cord segments to prevent movement of the cord segments relative to the fastener. More particularly, the invention relates to such cord fasteners that resist tampering by unauthorized persons.

2. Background of the Invention

Cord fasteners are used in many different applications to releasably retain one or more cord segments or drawstrings in a tightened condition and to release such cord segments when desired. For example, cord fasteners are used in connection with garments that include drawstrings, such as hooded jackets and sweatshirts. Such fasteners are also used on various types of bags such as laundry bags and other storage bags that utilize cords to temporarily close an open end of the bag. These cord fasteners vary in size depending on the particular application, from less than one inch long to several inches or more.

Another use of such cord fasteners is in connection with bags that contain relatively valuable goods, such as mail bags that contain insured mail. Those bags include an open end to permit loading and unloading of the bag, with such end being cinched by a cord. A cord fastener is preferably used to keep the end closed during transport of the bag. In addition, because the contents of the bag are at least potentially valuable, it is desirable to resist unauthorized persons from being able to gain access to the inside of the bag.

One cord lock device that has gained widespread acceptance by the United States Postal Service is a metal cord lock that is a relatively complex, bulky device with a relatively large number of parts. The cord lock device includes a lever arm that is pivotally connected to a base and that may be pivoted between cord releasing and cord engaging positions. The lever arm includes a slot that is sized to extend downwardly over a plate that projects upwardly from the base. The plate is formed with an opening therein. Thus, when the lever arm is pivoted to the cord engaging position, a lock may be inserted through the opening to lock the lever arm in the cord locking position.

While the above-described cord lock device provides a useful purpose, there are many drawbacks as well. In the first place, the device requires a relatively large number of parts, and is therefore economically inefficient. In addition, those large number of parts result in a relatively bulky device.

Accordingly, it will be apparent to those skilled in the art that it would be desirable to have a cord locking device that resists unauthorized persons from being able to manipulate the device. Furthermore, it would be desirable to have such a device that utilizes relatively few parts. The present invention satisfies these desirable features.

SUMMARY OF THE INVENTION

Briefly, and in general terms, the present invention provides a cord lock apparatus that releasably locks a pair of cord segments in place, and that itself can be locked to resist unauthorized persons from manipulating the cord lock device. The cord lock apparatus comprises a housing which slidably receives a slide member therewithin. The slide member is displaceable within the housing between respective cord lock and cord releasing positions. In the cord lock position, an opening on the housing at least substantially aligns with an opening on the slide member, through which a lock may be extended to resist relative movement between the slide member and housing, thereby locking the cord lock device in place.

In another preferred embodiment, the slide member includes an elongated shaft and a cord engaging structure that is connected to the shaft and also is displaceable relative to the shaft in both lateral and longitudinal directions.

Moreover, the cord lock apparatus is preferably designed such that in the cord engaging position, the cord engaging structure remains displaceable relative to the shaft in at least the longitudinal direction.

Thus, the cord lock apparatus of the present invention, in one preferred embodiment, includes a housing formed with an internal passage through which a pair of cord segments may pass. The passage defines a tapering region, and the housing further includes at least one opening at a predetermined location. The cord lock apparatus also includes a slide member that is slidably received within the passageway of the housing. The slide member is displaceable within the housing between respective cord locking and cord releasing positions. The slide member is connected to a cord engaging structure to cooperate with the tapering region when the slide member is in the cord locking position to releasably lock the cord segments in place between the tapering region and the cord engaging structure. The slide member further includes an opening formed at a predetermined location so as to be substantially aligned with the opening in the housing when the slide member is in the cord locking position. In addition, the cord engaging structure is connected to the slide member in such a manner that it is displaceable relative to the slide member in both a lateral and longitudinal direction.

In another embodiment, the invention is directed to a cord lock apparatus that includes a housing formed with an internal passage through which a pair of cord segments may pass. The passage is constructed so as to define a tapering region within the passage. The apparatus also includes a slide member that is slidably received within the passageway of the housing to travel between respective cord locking and cord releasing positions. The slide member includes an elongated central shaft and a cord engaging structure connected to the shaft in such a manner that it is displaceable relative to the shaft in both lateral and longitudinal directions. The cord engaging structure cooperates with the tapering region when the slide member is in the cord locking position to releasably lock the cord segments in place.

Other features and advantages of the present invention will become apparent from the following detailed description, taken in conjunction with the accompanying drawings which illustrate, by way of example, the features of the present invention.

DESCRIPTION OF THE DRAWINGS

FIG. 3 is a perspective view of a slide member included in the cord lock apparatus of FIG. 1;

FIG. 4 is a perspective view of a housing included in the cord lock apparatus of FIG. 1;

FIG. 5 is another perspective view of the slide member of FIG. 3, and with respective cord gripping segments extended laterally outwardly from a central shaft;

FIG. 6 is a cross-sectional view taken along the line 6—6 of FIG. 1; and

DETAILED DESCRIPTION OF THE PREFERRED EMBODIMENT

Figure 1:
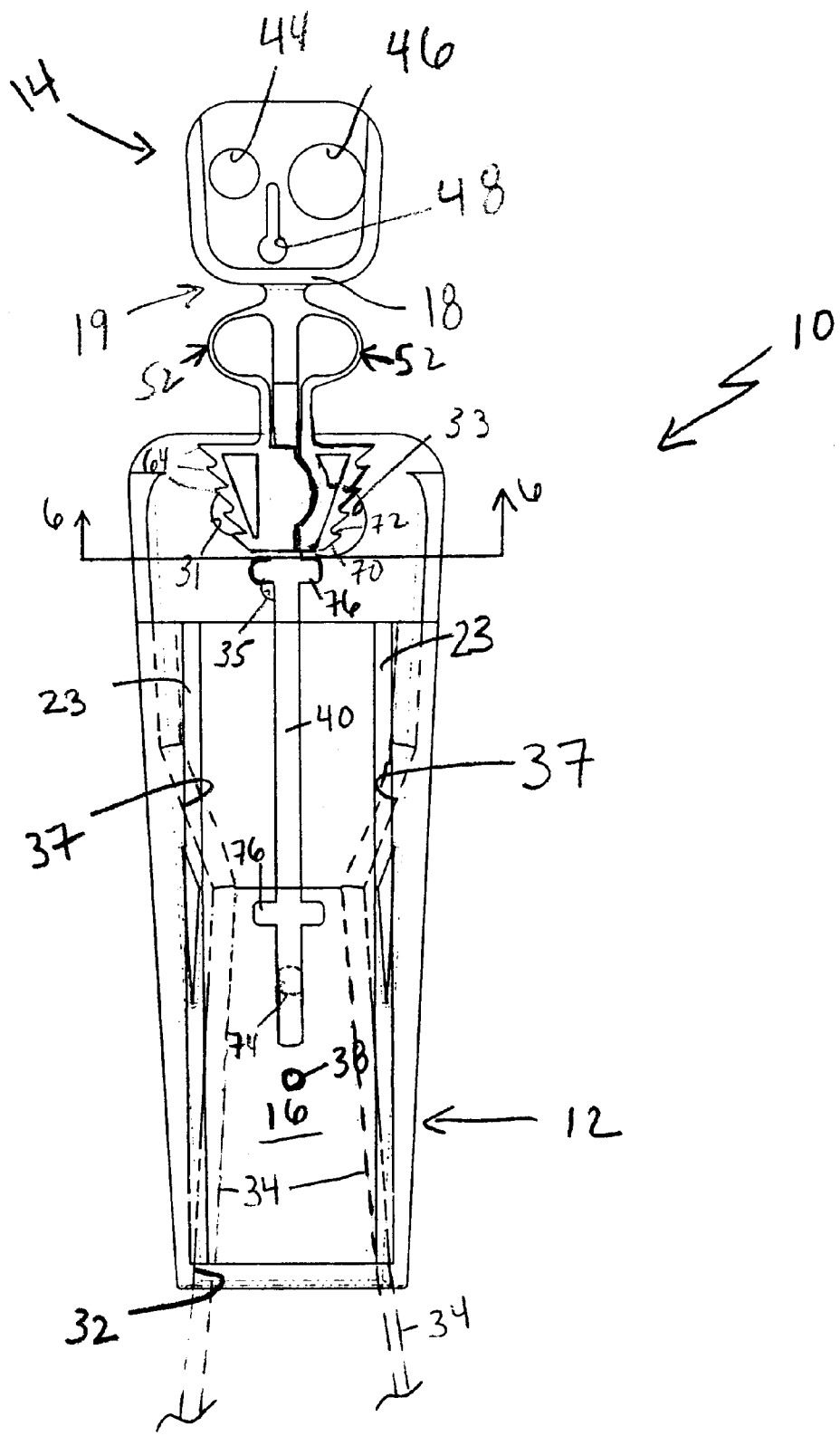
FIG. 1 is a front view of a cord lock apparatus according to one illustrative embodiment of the present invention, and showing a partially assembled housing and slide member comprising the cord lock apparatus.
Figure 2:
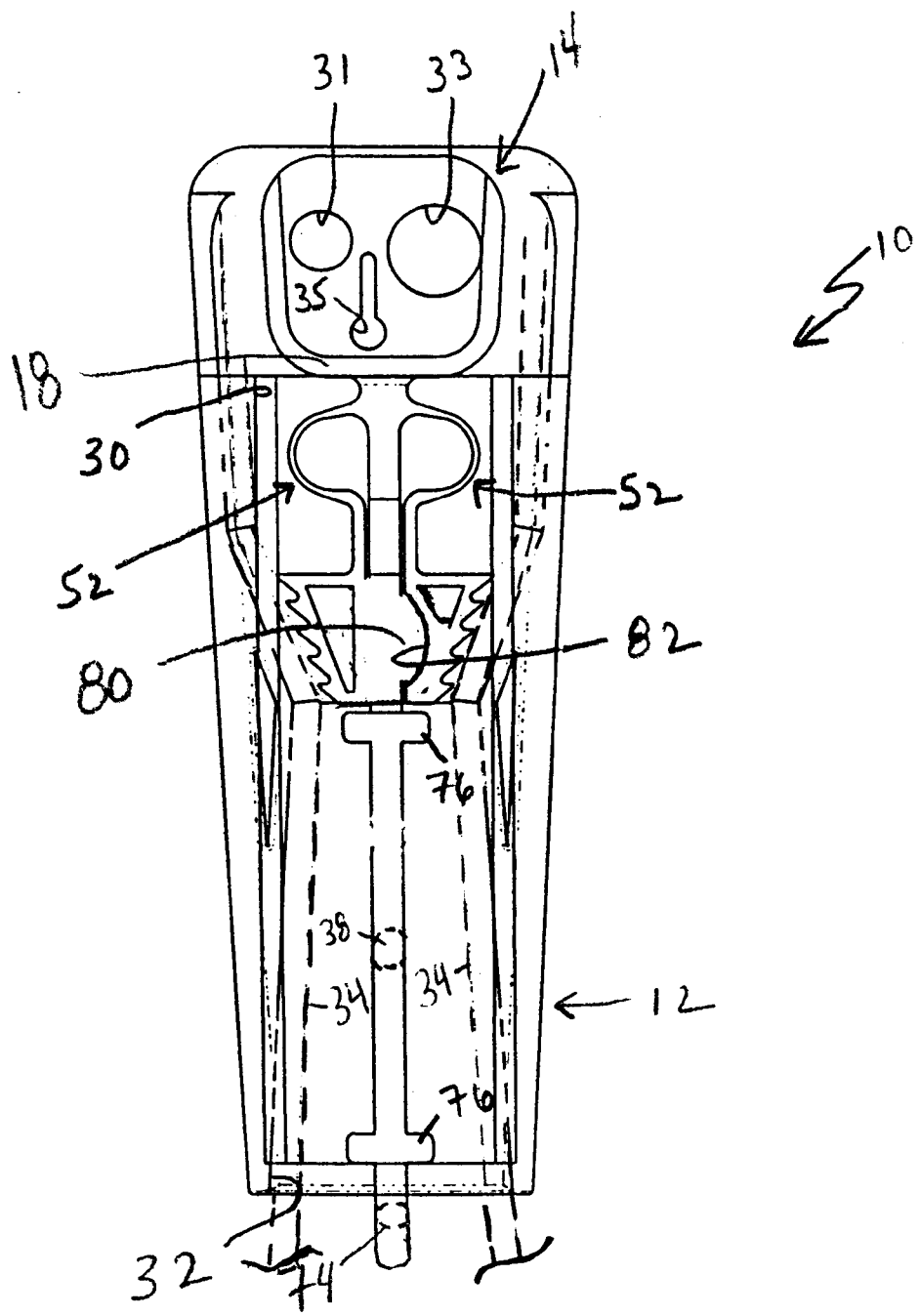
FIG. 2 is a front view of the cord lock apparatus of FIG. 1 with the cord lock apparatus in a cord locking position.

In the following detailed description, like reference numerals will be used to refer to like or corresponding elements in the different figures of the drawings. Referring now to the drawings, and particularly to FIGS. 1 and 2, there is shown a cord lock apparatus 10 that depicts one illustrative embodiment of the present invention. The cord lock apparatus comprises, generally, a housing 12 and a slide member 14 sized for slidable extension within housing 12. Housing 12 defines a through passageway 16 that is open at the opposite longitudinal ends of housing 12 for slidably containing at least a portion of slide member 14 therein, while permitting the slide member 14 to project from either longitudinal end of housing 12. The slide member 14 is displaceable relative to housing 12 between a cord locking position (FIG. 2) and a cord releasing position (FIG. 7) as described in greater detail below. The slide member 14 further includes an outwardly projecting flange defining a stop 18 that is disposed adjacent one end 19 of the slide member 14. Stop 18 cooperates with housing 12 to prevent further advancement of the slide member 14 into housing 12.

Referring to FIGS. 1 and 4, housing 12 includes substantially planar front and rear walls 22 and 24, and a pair of side walls 26 and 28. Housing 12 further includes an open first end 30 and an open second end 32, with second end 32 in one embodiment defining an opening that is smaller in cross section than that of the first end 30. Housing 12 defines through passageway 16 between the front and rear walls 22 and 24, with passageway 16 extending from the first end 30 of housing 12 to the second end 32. Thus, a pair of cord segments 34 (shown in phantom in FIGS. 1 and 2) may be extended through passageway 16.

In one illustrative embodiment, a portion 37 of passageway 16 tapers inwardly (FIG. 1). As described in more detail below, cord segments 34 are locked in place against the respective tapered portions 37 when slide member 14 is driven to the cord locking position.

In one illustrative embodiment (FIG. 4), housing 12 defines three spaced apart, through openings 31, 33, and 35 formed on a flange 39 extending from the rear wall 24. The openings 31, 33, and 35 preferably have different shapes and sizes to accommodate different types of locks, as is described in more detail below.

Housing 12 is also formed with a centrally disposed opening 38 formed in the rear wall 24 (shown in phantom in FIG. 4). It will be understood that opening 38 may be alternatively formed on front wall 22. Opening 38 cooperates with corresponding structure formed on slide member 14 to releasably hold slide member 14 at a cord releasing position (FIG. 7), as is described in more detail below.

Housing 12 is preferably formed of a hard, resilient and lightweight material such as a plastic resin, for example polypropylene, nylon, or acetal, and is typically manufactured by injection molding techniques well known to those skilled in the art.

In one illustrative embodiment (FIG. 4), housing 12 includes a pair of elongated, opposing, and inwardly extending flanges 23 formed on opposite sides of front wall 22. The flanges are closed at end 32 of housing 12, and are open at the opposite end 30, and cooperate with front wall 22 to define a pair of elongated grooves 25 therebetween. A card with printed indicia or other suitable label may be slidably inserted into the respective grooves 25, and is releasably held in place in those grooves.

Referring to FIGS. 3 and 5, slide member 14 preferably includes an elongated shaft 40 that connects at one end 19 to a handle portion 42 that defines the stop 18. The handle portion 42 is formed with a plurality of openings 44, 46, and 48, that correspond in shape and relative positioning to the respective openings 31, 33, and 35 formed on housing 12. It will be understood that the handle portion 42 may be formed with more than three openings, or with as few as one opening. The respective pairs of openings 31 and 44, 33 and 46, and 35 and 48 are substantially identical in size and shape, with the openings on housing 12 being formed at respective predetermined positions such that each pair of openings aligns when slide member 14 is in the cord locking position. In one embodiment, two of the pairs define circular openings to receive conventional locks therethrough, while the third pair defines an elongated slot to receive a conventional locking band.

Slide member 14 also includes a cord engaging structure 50. In the illustrative embodiment shown, cord engaging structure 50 consists of a pair of spring arms 52 connected to the shaft 40 adjacent end 19. Spring arms 52 are flexible and resilient, and include curved, generally C-shaped segments 54 that project generally laterally outwardly from shaft 40, and then curve through a semicircle and extend in a generally inward direction toward shaft 40. Segments 54 connect to respective axially (or longitudinally) projecting segments 56, which then connect to a pair of cord gripping segments, generally designated 58 and 60, which are disposed on either side of shaft 40. As is shown in FIGS. 3 and 5, the respective cord gripping segments 58 and 60 are not directly connected to shaft 40, but are rather carried by spring arms 52 so as to be freely disposed on either side of shaft 40, and therefore may be displaced relative to the shaft in both a longitudinal (or axial) direction as well as in a lateral direction, due to the configuration and flexibility of the respective spring arms 52.

Figure 7:
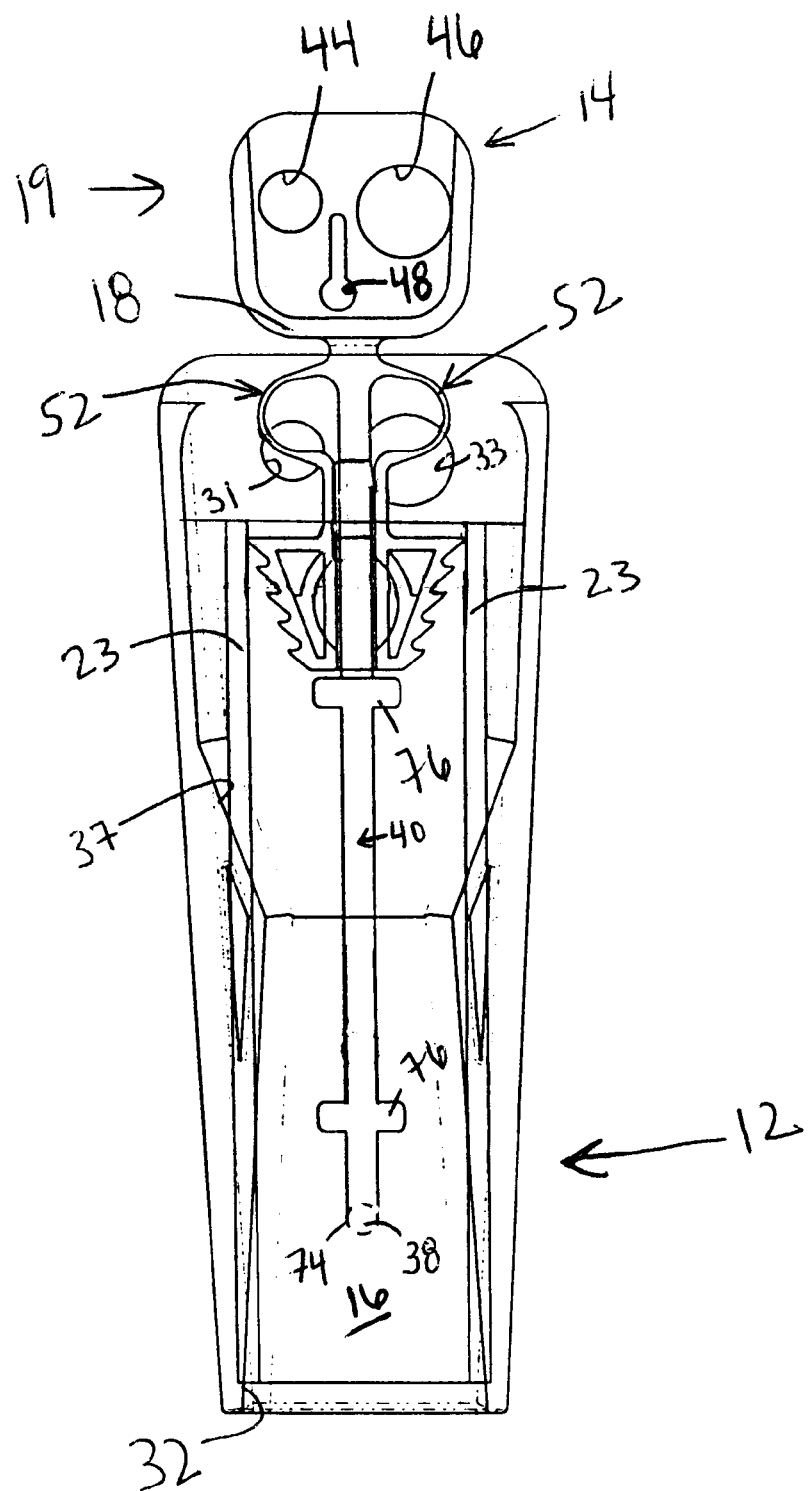
FIG. 7 is a front view of the cord lock apparatus of FIG. 1 with the cord lock apparatus in a cord releasing position.

The respective cord gripping segments 58 and 60 preferably include angled outer edges 62, each of which is formed with a plurality of serrations or teeth 64. The teeth of each cord gripping segment 58 and 60 include tips that lie in respective common planes that are substantially parallel to the inner surfaces of housing 12 at housing portion 37. The cord gripping segments are formed on the slide body 14 at predetermined locations to oppose the respective inner surfaces of portion 37 when slide body 14 is advanced to the cord locking position (FIG. 2). The cord gripping segments and inner surfaces of housing portion 37 cooperate to sandwich and securely hold respective cord segments therebetween. It will be understood that the cross-sectional dimensions of the cord paths will vary depending on the relative positions of slide body 14 and housing 12. Accordingly, the cord lock apparatus of the present invention can either lock the cord segments in place (when slide member 14 is in the cord locking position) or release the cord segments (when slide member 14 is in the cord releasing position) (FIG. 7).

The teeth 64 are formed with respective ramped first edges 70 and stepped second edges 72 to permit the cord segments to travel freely in an outward direction from the open end 30 of housing 12 and over the ramped first edges 70. However, when slide member 14 is adjacent to but not completely in the cord locking position, movement of the cord segments in an opposite direction (i.e., out of the open end 32 of housing 12) causes one or more of the stepped second edges 72 of the teeth 64 to engage the respective cord segments, thereby drawing the slide member 14 inwardly relative to housing 12 and into the cord locking position (FIG. 2) such that the cord gripping segments 58 and 60 and housing portion 37 cooperate to confine and compress the cord segments therebetween to lock the cord segments in place.

Referring to FIGS. 3, 5, and 6, the cord engaging structure 50 is configured in such a manner that the cord gripping segments 58 and 60 do not come into contact with shaft 40, even when the slide member 14 is in the cord locking position. As is shown in FIGS. 3 and 5, cord gripping segment 58 is formed on a front t side with an arcuate protrusion 80, and cord gripping segment 60 is formed with a complementary shaped recess 82. Similarly, cord gripping segment 58 is formed on a rear side with an arcuate recess 84, with cord gripping segment 60 being formed with a complementary protrusion 86. With the slide member 14 advanced to the cord locking position, an inwardly directed force applied by the cord segments to cord gripping segments 58 and 60 causes the cord gripping segments 58 and 60 to be compressed together, with the respective protrusions 80 and 86 nesting in the corresponding recesses 82 and 84, thereby preventing further compression of the cord engaging structure. When the protrusions 80 and 86 are nested in the recesses 82 and 84, the gripping segments 58 and 60 define a square passageway 88 that is larger than the cross-sectional dimensions of shaft 40 (FIG. 6). As such, the gripping segments 58 and 60 are free from engaging contact with shaft 40, even in the cord locking position, and may be displaced in an axial direction relative to shaft 40 by either expanding or compressing the respective spring arms 52.

The slide member 14 further has formed thereon an outwardly projecting member 74 that is located adjacent the lower (or inner) end of shaft 40. Member 74 is configured to be releasably received in receptacle 38 at a cord releasing position (FIG. 7), to releasably lock the slide member 14 in place and to permit the cord segments to freely pass through housing 12.

In one illustrative embodiment, slide member 14 includes a pair of laterally outwardly extending cross-members 76 projecting outwardly from shaft 40. Cross-members 76 provide protection against insertion of a tool or other instrument through open end 32 of housing 12, thereby preventing or at least significantly impeding attempts to tamper with the device 10 by a person inserting an instrument through open end 32. It will be apparent that more or less than two cross-members 76 may be provided on shaft 40.

As is shown in FIG. 4, cord lock apparatus 10 has a relatively low cross-sectional profile and has an unobtrusive configuration. Accordingly, cord lock apparatus 10 is suitable for many applications that require a cord fastener having such characteristics.

It will also be apparent to those skilled in the art that the ability of the slide 14 to freely move relative to housing 12 allows the cord lock apparatus 10 to accommodate a wide range of cord segment diameters. Because the slide is free to move within housing 12, the cord locking position can vary significantly depending on the size of the cord segments 34, as can the cord releasing position. In addition, both the angle and length of the tapering portion 37 of housing 12 can be altered to accommodate a wide range of cord segments.

In use, a user may grasp housing 12 and extend a pair of cord segments from a drawstring or the like through housing 12 to a desired extent. The slide member 14 is then inserted into housing 12 through open end 30 and is advanced through housing 12 until the slide member 14 is in the cord locking position. A lock may then be inserted through one of the pairs of openings 31 and 44, 33 and 46, and 35 and 48 to lock the device 10.

When it is desirable to release the cord segments, the lock is removed, and a user may simply grasp the handle 42 and pull the handle away from housing 12, causing the slide member 14 to be driven outwardly relative to housing 12 (FIG. 1 or 7) and into the cord releasing position to release the cord segments. The cord segments are then free to move within housing 12, and may be drawn inwardly to loosen the cord. To unlock the cord segments from a very high load condition, the user can impact the overhanging portion of shaft 40 against a tabletop or the like, which in one embodiment causes one of the cross members 76 to dislodge the respective locking members 58 and 60. Also, to prevent the lock 10 from falling off of the cord segments 34 when not in use, the user may reinsert slide member 14 into housing 12 until slide member 14 is in the cord locking position.

From the foregoing, it will be apparent that the cord lock apparatus of the present invention provides a reliable device that may be locked in place to resist tampering. In addition, by providing the specially formed cord gripping segments that are not directly connected to shaft 40, the cord gripping segments 58 and 60 can be displaced relative to shaft 40, even in high load conditions.

While forms of the invention have been described, it will be apparent to those skilled in the art that various modifications and improvements may be made without departing from the spirit and scope of the invention. As such, it is not intended that the invention be limited, except as by the appended claims.

I claim:

1. A cord lock apparatus for releasably locking a pair of cord segments in place, the cord lock apparatus comprising:

a housing formed with an internal passage through which the cord segments may pass, the passage defining a tapering region, the housing further including at least one opening at a predetermined location;

a slide member that is sized for slidable receipt within the passageway of the housing and displaceable within the housing between respective cord locking and cord releasing positions, the slide member including a slide body and a cord engaging structure connected to the slide body and displaceable relative to the slide body in both a lateral and longitudinal direction, wherein the cord engaging structure cooperates with the tapering region when the slide member is in the cord locking position to releasably lock the cord segments in place between the tapering region and the cord engaging structure, the slide body further including an opening formed at a predetermined location so as to be substantially aligned with the opening in the housing when the slide member is in the cord locking position.

2. The cord lock apparatus of claim 1 wherein:

the housing and slide member each have plural openings formed at respective locations thereon, wherein each of the openings in the housing is in substantial alignment with a corresponding opening in the slide member when the slide member is in the cord locking position.

3. The cord lock apparatus of claim 1 wherein:

the openings in the housing and slide member are generally circular in cross section and sized to receive a shaft of a lock.

4. The cord lock apparatus of claim 1 wherein:
the housing includes an open first end having a first cross-sectional dimension, a tapered intermediate segment, and an open second end having a second cross-sectional dimension smaller than the first cross-sectional dimension; and
the cord engaging structure comprises a pair of cord gripping segments, each of which includes a plurality of outwardly projecting teeth to cooperate with the tapered intermediate segment to confine said cord segments therebetween.

5. The cord lock apparatus of claim 1 wherein:
the slide member further includes an outwardly projecting stop disposed adjacent one end of the slide member to resist further insertion of the slide member into the housing.

6. The cord lock apparatus of claim 1 wherein:
the housing is formed with an opening at a preselected location thereon; and
the slide member includes an outwardly extending knob for releasable engagement with the opening when the slide member is displaced a predetermined distance from the cord lock position.

7. The cord lock apparatus of claim 1 wherein:
the slide body is designed such that a lower end thereof projects from a lower end of the housing when the slide member is in the cord locking position.

8. The cord lock apparatus of claim 1 wherein:
the slide body includes an elongated shaft that is formed having at least one laterally extending cross-member formed on the shaft.

9. The cord lock apparatus of claim 8 wherein:
the shaft includes at least two cross-members at respective spaced apart locations.

10. The cord lock apparatus of claim 1 wherein:
the cord engaging structure comprises a pair of laterally and longitudinally displaceable engaging members and a pair of spring arms connected to the slide body and to the respective engaging members.

11. The cord lock apparatus of claim 10 wherein each of the engaging members includes a plurality of outwardly projecting teeth to engage a corresponding cord segment.

12. The cord lock apparatus of claim 10 wherein each of the spring arms includes a first end connected to the slide body and a second end connected to a corresponding one of the engaging members, each spring arm also including a resilient, generally C-shaped intermediate portion between the first and second ends.

13. The cord lock apparatus of claim 10 wherein one of the engaging members includes an arcuate recess and the other engaging member includes an arcuate projection, wherein the projection is sized for nesting in the recess when the engaging members are driven together in the cord locking position.

14. The cord lock apparatus of claim 1 wherein:
the slide body includes an elongated shaft, and the cord engaging members are movable relative to the shaft and are designed to encircle the shaft without contacting the shaft when the slide member is in the cord locking position.

15. The cord lock apparatus of claim 1 wherein:
the housing is formed on one surface with a receptacle that is dimensioned to slidably receive a label therein.

16. A cord lock apparatus for receipt of a pair of cord segments and operative to releasably lock the cord segments in place, the cord lock apparatus comprising:

a housing formed with an internal passage through which the cord segments may pass, the passage defining a tapering region; and a slide member that is slidably received within the passageway of the housing and displaceable within the housing between respective cord locking and cord releasing positions, the slide member including an elongated central shaft and a cord engaging structure connected to the shaft and displaceable relative thereto in both a lateral and longitudinal direction, wherein the cord engaging structure cooperates with the tapering region when the slide member is in the cord locking position to releasably lock the cord segments in place between the tapering region and the cord engaging structure.

17. The cord lock apparatus of claim 16 wherein:
the housing and slide member are each formed with at least one opening formed at respective locations thereon, wherein the opening in the housing is in substantial alignment with the opening in the slide member when the slide member is in the cord locking position.

18. The cord lock apparatus of claim 17 wherein:
the openings in the housing and slide member are generally circular in cross section to receive a hasp of a lock.

19. The cord lock apparatus of claim 16 wherein:
the housing includes an open first end having a first cross-section dimension, a tapered intermediate segment, and an open second end having a second cross-sectional dimension smaller than the first cross-sectional dimension; and
the cord engaging structure comprises a pair of cord gripping segments, each of which includes a plurality of outwardly projecting teeth to cooperate with the tapered intermediate segment to confine said cord segments therebetween.

20. The cord lock apparatus of claim 16 wherein:
the slide member further includes an outwardly projecting stop disposed adjacent one end of the slide member to resist further insertion of the slide member into the housing.

21. The cord lock apparatus of claim 16 wherein:
the housing is formed with a catch at a preselected location thereon; and
the slide member includes a projection that is sized for releasable engagement with the catch when the slide member is in the cord releasing position.

22. The cord lock apparatus of claim 16 wherein:
the shaft is designed such that a lower end thereof projects from a lower end of the housing when the slide member is in the cord locking position.

23. The cord lock apparatus of claim 16 wherein:
the shaft is formed having at least one laterally extending cross-member.

24. The cord lock apparatus of claim 23 wherein:
the shaft includes at least two cross-members at respective spaced apart locations.

25. The cord lock apparatus of claim 16 wherein:
the cord engaging structure comprises a pair of laterally and longitudinally displaceable engaging members and a pair of spring arms connected to the shaft and to the respective engaging members.

26. The cord lock apparatus of claim 25 wherein each of the engaging members includes a plurality of outwardly projecting teeth to engage a corresponding cord segment.

27. The cord lock apparatus of claim 25 wherein each of the spring arms includes a first end connected to the shaft and a second end connected to a corresponding one of the engaging members, each spring arm also including a resilient, generally C-shaped intermediate portion between the first and second ends.

28. The cord lock apparatus of claim 25 wherein one of the engaging members includes an arcuate recess and the other engaging member includes an arcuate projection, wherein the projection is sized for nesting in the recess when the engaging members are driven together in the cord locking position.

29. The cord lock apparatus of claim 25 wherein:

the cord engaging members are movable relative to the shaft and encircle the shaft without contacting the shaft when the slide member is in the cord locking position.

30. The cord lock apparatus of claim 16 wherein:

the housing is formed on one surface with a receptacle that is dimensioned to slidably receive a label therein.

31. A cord lock apparatus for releasably locking a pair of cord segments in place, the cord lock apparatus comprising:

a housing formed with an internal passage through which the cord segments may pass, the passage defining a tapering region; and a slide member that is sized for slidable receipt within the passageway of the housing and displaceable within the housing between respective cord locking and cord releasing positions, the slide member including an elongated shaft and a cord engaging structure comprising a pair of spring arms connected to the shaft and a pair of cord gripping segments connected to the respective spring arms, wherein the shaft is designed such that a lower end thereof projects from a lower end of the housing when the slide member is in the cord locking position, and wherein the cord engaging structure cooperates with the tapering region when the slide member is in the cord locking position to releasably lock the cord segments in place between the tapering region and the cord engaging structure.

32. The cord lock apparatus of claim 31 wherein:

the housing and slide member each have at least one opening formed at respective locations, wherein the at least one opening in the housing is in substantial alignment with at least one opening in the slide member when the slide member is in the cord locking position.

33. The cord lock apparatus of claim 32 wherein:

the openings in the housing and slide member are generally circular in cross section to receive a hasp of a lock.

34. The cord lock apparatus of claim 31 wherein:

the housing includes an open first end having a first cross-section dimension, a tapered intermediate segment, and an open second end having a second cross-sectional dimension smaller than the first cross-sectional dimension; and the cord engaging structure comprises a pair of cord gripping segments, each of which includes a plurality of outwardly projecting teeth to cooperate with the tapered intermediate segment to confine said cord segments therebetween.

35. The cord lock apparatus of claim 31 wherein:

the slide member further includes an outwardly projecting stop disposed adjacent one end of the slide member to resist further insertion of the slide member into the housing.

36. The cord lock apparatus of claim 31 wherein:

the housing is formed with an opening at a preselected location thereon; and the slide member includes an outwardly extending member for releasable engagement with the opening when the slide member is a predetermined distance from the cord locking position.

37. The cord lock apparatus of claim 31 wherein:

the housing is formed on one surface with a receptacle that is dimensioned to slidably receive a label therein.

38. The cord lock apparatus of claim 31 wherein:

the shaft is formed having at least one laterally extending cross-member formed on the shaft.

39. The cord lock apparatus of claim 38 wherein:

the shaft includes at least two cross-members at respective spaced apart locations.

40. The cord lock apparatus of claim 31 wherein:

the cord engaging structure comprises a pair of laterally and longitudinally displaceable cord engaging members and a pair of spring arms connected to the shaft and to the respective engaging members.

41. The cord lock apparatus of claim 40 wherein each of the cord engaging members includes a plurality of outwardly projecting teeth to engage a corresponding cord segment.

42. The cord lock apparatus of claim 40 wherein each of the spring arms includes a first end connected to the shaft and a second end connected to a corresponding one of the cord engaging members, and wherein each spring arm also includes a resilient, generally C-shaped intermediate portion between the first and second ends.

43. The cord lock apparatus of claim 40 wherein one of the cord engaging members includes an arcuate recess and the other cord engaging member includes an arcuate projection, wherein the projection is sized for nesting in the recess when the cord engaging members are driven together in the cord locking position.

44. The cord lock apparatus of claim 40 wherein:

the cord engaging members are movable relative to the shaft and encircle the shaft without contacting the shaft when the slide member is in the cord locking position.

* * * * *